US008254049B2

(12) United States Patent  
Annampedu

(10) Patent No.: US 8,254,049 B2
(45) Date of Patent: Aug. 28, 2012

(54) SYSTEMS AND METHODS FOR IMPROVED SYNCHRONIZATION BETWEEN AN ASYNCHRONOUSLY DETECTED SIGNAL AND A SYNCHRONOUS OPERATION

(75) Inventor: Viswanath Annampedu, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 920 days.

(21) Appl. No.: 11/841,026

(22) Filed: Aug. 20, 2007

(65) Prior Publication Data

US 2009/0052075 A1  Feb. 26, 2009

(51) Int. Cl.
*G11B 5/09* (2006.01)

(52) U.S. Cl. ........... 360/51; 360/29; 360/39; 360/48; 360/53

(58) Field of Classification Search .............. None
See application file for complete search history.

(56) References Cited

U.S. PATENT DOCUMENTS

| 3,973,182 | A |   | 8/1976  | Kataoka          |         |
|-----------|---|---|---------|------------------|---------|
| 3,973,183 | A |   | 8/1976  | Kataoka          |         |
| 4,024,571 | A |   | 5/1977  | Dischert et al.  |         |
| 4,271,519 | A | * | 6/1981  | Hall             | 714/771 |
| 4,310,861 | A | * | 1/1982  | Kashio           | 360/50  |
| 4,777,544 | A |   | 10/1988 | Brown et al.     |         |
| 5,130,866 | A |   | 7/1992  | Klaassen et al.  |         |
| 5,237,325 | A |   | 8/1993  | Klein et al.     |         |
| 5,278,703 | A |   | 1/1994  | Rub et al.       |         |
| 5,309,357 | A |   | 5/1994  | Stark et al.     |         |
| 5,341,249 | A |   | 8/1994  | Abbott et al.    |         |
| 5,377,058 | A |   | 12/1994 | Good et al.      |         |
| 5,521,948 | A |   | 5/1996  | Takeuchi         |         |
| 5,523,902 | A |   | 6/1996  | Pederson         |         |
| 5,668,679 | A |   | 9/1997  | Swearingen et al.|         |
| 5,696,639 | A |   | 12/1997 | Spurbeck et al.  |         |
| 5,706,265 | A | * | 1/1998  | Bang             | 369/47.48 |
| 5,781,129 | A |   | 7/1998  | Schwartz et al.  |         |
| 5,798,885 | A |   | 8/1998  | Saiki et al.     |         |
| 5,835,295 | A |   | 11/1998 | Behrens          |         |
| 5,844,920 | A |   | 12/1998 | Zook et al.      |         |
| 5,852,524 | A |   | 12/1998 | Glover et al.    |         |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Dismery Mercedes  
(74) *Attorney, Agent, or Firm* — Hamilton, Desanctis & Cha

(57) ABSTRACT

Various embodiments of the present invention provide systems and methods for synchronizing data processing. As one example, a method for synchronizing data processing is disclosed that includes receiving a data input, and sampling the data input at a sample period to generate a sample set. A first pattern is received and a first periodic boundary associated with the first pattern is identified. In one particular case, the first pattern is a preamble pattern included as sector data on a storage medium, and the first periodic boundary is a 4T boundary. Further, a second pattern is detected in the sample that is used to establish a second periodic boundary. In one particular case, the second pattern is a SAM pattern included as sector data on a storage medium, and the second periodic boundary is a 1T boundary. Based at least in part on the first periodic boundary and the second periodic boundary, a time to transmit or assert a data-found signal is determined.

40 Claims, 6 Drawing Sheets

U.S. PATENT DOCUMENTS

| | | | |
|---|---|---|---|
| 5,986,830 | A | 11/1999 | Hein |
| 5,987,562 | A | 11/1999 | Glover |
| 6,009,549 | A | 12/1999 | Bliss et al. |
| 6,023,383 | A | 2/2000 | Glover et al. |
| 6,069,583 | A | 5/2000 | Silverstrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,278,591 | B1 | 8/2001 | Chang |
| 6,400,518 | B1 | 6/2002 | Bhaumik et al. |
| 6,404,829 | B1 | 6/2002 | Sonu |
| 6,441,661 | B1 | 8/2002 | Aoki et al. |
| 6,480,984 | B1 * | 11/2002 | Aziz ............................ 714/795 |
| 6,490,110 | B2 * | 12/2002 | Reed et al. ...................... 360/48 |
| 6,493,162 | B1 | 12/2002 | Fredrickson |
| 6,519,102 | B1 | 2/2003 | Smith et al. |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,633,447 | B2 | 10/2003 | Franck et al. |
| 6,646,822 | B1 | 11/2003 | Tuttle et al. |
| 6,657,802 | B1 * | 12/2003 | Ashley et al. .................... 360/51 |
| 6,775,529 | B1 | 8/2004 | Roo |
| 6,788,484 | B2 | 9/2004 | Honma |
| 6,813,108 | B2 * | 11/2004 | Annampedu et al. ........... 360/51 |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B1 | 11/2005 | Hayashi |
| 6,999,257 | B2 | 2/2006 | Takeo |
| 6,999,264 | B2 | 2/2006 | Ehrlich |
| 7,002,767 | B2 * | 2/2006 | Annampedu et al. ........... 360/75 |
| 7,038,875 | B2 | 5/2006 | Lou et al. |
| 7,054,398 | B1 * | 5/2006 | Wu et al. ....................... 375/354 |
| 7,072,137 | B2 | 7/2006 | Chiba |
| 7,082,005 | B2 * | 7/2006 | Annampedu et al. ........... 360/51 |
| 7,092,177 | B2 * | 8/2006 | Ehrlich ............................ 360/29 |
| 7,092,462 | B2 * | 8/2006 | Annampedu et al. ......... 375/340 |
| 7,116,504 | B1 | 10/2006 | Oberg |
| 7,126,776 | B1 | 10/2006 | Warren, Jr. et al. |
| 7,136,250 | B1 | 11/2006 | Wu et al. |
| 7,154,689 | B1 | 12/2006 | Shepherd et al. |
| 7,167,328 | B2 | 1/2007 | Annampedu et al. |
| 7,180,693 | B2 | 2/2007 | Annampedu et al. |
| 7,187,739 | B2 | 3/2007 | Ma |
| 7,191,382 | B2 | 3/2007 | James et al. |
| 7,193,798 | B2 | 3/2007 | Byrd et al. |
| 7,199,961 | B1 | 4/2007 | Wu et al. |
| 7,203,013 | B1 | 4/2007 | Han et al. |
| 7,206,146 | B2 | 4/2007 | Flynn et al. |
| 7,230,789 | B1 | 6/2007 | Brunnett et al. |
| 7,253,984 | B1 | 8/2007 | Patapoutian et al. |
| 7,301,717 | B1 | 11/2007 | Lee et al. |
| 7,308,057 | B1 | 12/2007 | Patapoutian |
| 7,362,536 | B1 | 4/2008 | Liu et al. |
| 7,375,918 | B1 | 5/2008 | Shepherd et al. |
| 7,411,531 | B2 | 8/2008 | Aziz et al. |
| 7,420,498 | B2 | 9/2008 | Barrenscheen |
| 7,423,827 | B2 | 9/2008 | Neville et al. |
| 7,446,690 | B2 | 11/2008 | Kao |
| 7,499,238 | B2 | 3/2009 | Annampedu |
| 7,620,101 | B1 | 11/2009 | Jenkins |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2003/0095350 | A1 * | 5/2003 | Annampedu et al. ........... 360/39 |
| 2005/0046982 | A1 | 3/2005 | Liu et al. |
| 2005/0157415 | A1 | 7/2005 | Chiang |
| 2005/0243455 | A1 | 11/2005 | Annampedu |
| 2006/0023583 | A1 * | 2/2006 | Annampedu et al. ........ 369/47.1 |
| 2006/0023603 | A1 * | 2/2006 | Annampedu et al. ...... 369/59.22 |
| 2006/0132955 | A1 * | 6/2006 | Annampedu et al. ........... 360/49 |
| 2007/0071152 | A1 | 3/2007 | Chen et al. |
| 2007/0104300 | A1 | 5/2007 | Esumi et al. |
| 2007/0183073 | A1 | 8/2007 | Sutardja et al. |
| 2007/0230015 | A1 | 10/2007 | Yamashita |
| 2007/0263311 | A1 | 11/2007 | Smith |
| 2007/0285817 | A1 * | 12/2007 | Lau ................................ 360/39 |
| 2008/0080082 | A1 | 4/2008 | Erden et al. |
| 2008/0212715 | A1 | 9/2008 | Chang |
| 2008/0266693 | A1 | 10/2008 | Bliss et al. |
| 2009/0002862 | A1 | 1/2009 | Park |
| 2009/0142620 | A1 | 6/2009 | Yamamoto et al. |

OTHER PUBLICATIONS

.Aziz and Annampedu, "Asynchronous Maximum Likelihood (ML) Detection of Servo repeatable Run Out (RRO) Data".

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR IMPROVED SYNCHRONIZATION BETWEEN AN ASYNCHRONOUSLY DETECTED SIGNAL AND A SYNCHRONOUS OPERATION

BACKGROUND OF THE INVENTION

The present invention is related to systems and methods for accessing a magnetic storage medium, and more particularly to systems and methods for detecting data patterns from a magnetic storage medium.

A read channel integrated circuit (IC) is one of the core electronic components in a magnetic recording system such as a hard disk drive. A read channel converts and encodes data to enable magnetic read heads to write data to the disk drive and then read back the data accurately. The disks in a drive typically have many tracks on them. Each track typically consists of user data sectors, as well as control or "servo" data sectors embedded between the user sectors. The servo sectors help to position the magnetic recording head on a track so that the information stored in the read sectors is retrieved properly.

FIG. 1a depicts a data format of a servo data sector 100. As shown, servo data sector 100 may include a preamble pattern 102 which allows the system to recover the timing and gain of the written servo data. Preamble pattern 102 is typically followed by a servo address mark (SAM) 104 which is the same for all servo sectors. SAM 104 is then followed by encoded servo Gray data 106, and Gray data 106 is followed by one or more burst demodulation fields 108. Gray data 106 may represent the track number/cylinder information and provides coarse positioning information for a read head traversing a magnetic storage medium. Burst demodulation field 108 provides fine positioning information for the read head traversing a magnetic storage medium. FIG. 1b shows the aforementioned servo data sector 100 incorporated as part of each of a number of tracks 160 each extending in a radial pattern around a radial magnetic storage medium 150. In an ideal case, a read head traverses an individual track over alternating servo data sectors and user data sectors.

When synchronizing to magnetic storage medium 150, data obtained using a read head traversing the medium is typically equalized to a desired target partial response by an equalizer configured as a continuous time filter (CTF) followed by a discrete-time finite impulse response (FIR) filter. In a synchronous system, the sampling of the CTF output signal uses timing information generated by a digital phase-locked loop (DPLL) locked to the symbol rate (T). The output samples of the equalizer are quantized to digital sample values ('Y' values) using an A/D converter (ADC). The 'Y' values are applied to a data detector (e.g., threshold detector or Viterbi detector). A SAM detector then searches for the SAM bit pattern in the detected data. Once SAM is detected, the Gray code decoder decodes the data following the SAM data as Gray data. The burst demodulation is timed with respect to the detected SAM data based on known lengths of the SAM and Gray data. The detected SAM data thus serves as a reference for timing of the burst demodulation operation.

FIG. 2 depicts an exemplary prior art synchronous SAM detector 200 for detecting an L-bit SAM. At every codeword boundary (i.e., at each 4T interval or boundary), the detected bit is shifted into an L-bit shift register 201 (which is initialized with L logic 1's before detection begins). The L-bits in L-bit shift register 201 are continuously compared by an L-bit comparator 203 with a copy of the known L-bit pattern [s(1) s(2) ... s(L)] used for the SAM that is stored in an L-bit SAM register 202. If the bit patterns of L-bit shift register 201 and L-bit SAM register 202 match, then SAM detection is declared. Otherwise, the detection and shifting process continues until the SAM is found. As mentioned above, in a synchronous system, the SAM is detected using samples retimed with a recovered clock driven by a digital phase-locked loop. However, radial phase incoherence has been found to render SAM detection difficult in a synchronous system.

FIG. 3 depicts an exemplary prior art read channel 300 that provides for asynchronous SAM detection. Readback data is received by read channel 300 from, for example, a magnetic storage medium via magnetic read head (not shown) and then equalized by an equalizer 302. Equalizer 302 may include a continuous time filter (CTF) 304 followed by a discrete-time, finite impulse response (FIR) filter 306 via a switch 305. A servo waveform corresponding to an encoded servo pattern is equalized by equalizer 302. The equalized waveform is provided to an A/D converter 308 as a T-symbol-rate target-response-equalized analog signal. The digital values at the output of A/D converter 308 are referred to as the y(kT) values, where k is an integer.

The synchronous symbol-rate samples from A/D converter 308 are then interpolated using digital interpolators 312. The outputs of digital interpolators 312 are interpolated y values from y(kT+T/8) to y(kT+7T/8). The y(kT) samples from A/D converter 308 and the interpolated y values from digital interpolators 312 are provided to an asynchronous data detector 314, where the values are processed in an asynchronous manner. Of note, since interpolation typically involves the generation of estimated y values falling between two consecutive synchronous y samples, the interpolated values y(kT+T/8) to y(kT+7T/8) are generated after time (k+1)T using (at least) synchronous samples y(kT) and y((k+1)T). In addition, the output of A/D converter 308 is also provided to a burst demodulator 316. The operation of burst demodulator 316 is timed to a signal provided by an asynchronous data detector 314 indicating that the SAM data has been found. The output of asynchronous data detector 314 is commonly referred to as the "SAMFOUND" signal. When SAM data is detected by asynchronous data detector 314, a SAMFOUND signal is provided to burst demodulator 316 which includes a counter that waits a certain time (e.g., based on the amount of data between the end of SAM 104 and the beginning of burst demodulation field 108 of FIG. 1 taking into account the known processing speed of asynchronous data detector 314) from receipt of the SAMFOUND signal before starting burst demodulation. The output of burst demodulator 316 is demodulated data. The output of asynchronous data detector 314 is also provided to a block decoder 318 for decoding SAM and Gray data. The output of block decoder 318 is decoded servo SAM and Gray data.

In the aforementioned approach, a resolution of T/8 is used to provide a reasonably accurate data detection. In particular, the asynchronous best phase (with a resolution of T/8) corresponding to SAMFOUND is compared with a threshold of 3T/8 to determine whether to begin processing burst demodulation field 108 based on the timing of the current cycle or the next cycle. If the best phase is less than or equal to 3T/8, then the counter used in processing burst demodulation field 308 starts counting from the current cycle. In contrast, where the best phase is greater than 3T/8 the counter used in processing burst demodulation field 308 starts counting from the next cycle. While the aforementioned approach to data detection is reasonably accurate, it may be susceptible to catastrophic failures in certain limited instances. In particular, the SAMFOUND signal may be off by 1T when, for example, a combination of noise and an interpolation phase at or near T/4 occurs.

Hence, for at least the aforementioned reasons, there exists a need in the art for advanced systems and methods for synchronization.

BRIEF SUMMARY OF THE INVENTION

The present invention is related to systems and methods for accessing a magnetic storage medium, and more particularly to systems and methods for detecting data patterns from a magnetic storage medium.

Various embodiments of the present invention provide methods for synchronizing data processing. Such methods include receiving a data input, and sampling the data input at a sample period to generate a sample set. A first pattern is detected in the sample that is used to establish a first periodic boundary. In one particular case, the first pattern is a preamble pattern included as sector data on a storage medium, and the first periodic boundary is a 4T boundary. Further, a second pattern is detected in the sample that is used to establish a second periodic boundary. In one particular case, the second pattern is a SAM pattern included as sector data on a storage medium, and the second periodic boundary is a 1T boundary. Based at least in part on the first periodic boundary and the second periodic boundary, a time to transmit or assert a data-found signal is determined.

In the particular case where the first periodic boundary is a 4T boundary and the second periodic boundary is a 1T boundary, the sample period may be, for example, T with eight interpolated points being generated for each sample period. In such a case, thirty two interpolated points of the data input are created between each 4T boundary, and eight interpolated points are created between each 1T boundary. Based on a subset of the eight interpolated points between each 1T boundary, the second periodic boundary is determined, and a phase location of the second periodic boundary relative to the first periodic boundary is determined.

In some instances of the aforementioned embodiment, determining the time to transmit the data-found signal includes: (1) transmitting the data-found signal substantially coincident with the current second periodic boundary when the second periodic boundary and the first periodic boundary are in the same phase; or (2) transmitting the data-found signal substantially coincident with the next first periodic boundary or the preceding first periodic boundary when the second periodic boundary and the first periodic boundary are in different phases. As one example where the first periodic boundary is a 4T boundary and the second periodic boundary is a 1T boundary, and the data-found signal may be transmitted substantially coincident with the current first periodic boundary, and the first periodic boundary and the second periodic boundary are considered in the same phase when the second periodic boundary occurs within +/−1T of the first periodic boundary. As another example where the first periodic boundary is a 4T boundary and the second periodic boundary is a 1T boundary, the data-found signal is transmitted substantially coincident with the next first periodic boundary or the preceding first periodic boundary, and the first periodic boundary and the second periodic boundary are considered to be in different phases when the second periodic boundary occurs more than 1T away from the first periodic boundary.

Other embodiments of the present invention provide systems for data synchronization. Such systems include a first circuit for sampling a data input at a first sample period, and generating a sample set. The systems further include a second circuit and a third circuit that each receives the sample set. The second circuit is operable to receive and/or detect a first pattern in the sample set, and to receive and/or establish a first periodic boundary based on detection of the first pattern. The third circuit is operable to detect a second pattern in the sample set, and to establish a second periodic boundary based on detection of the second pattern. The system further includes a fourth circuit that is operable to assert a data-found signal based at least in part on a relationship of the second periodic boundary with the first periodic boundary. In one particular instance of the aforementioned embodiments, the system further includes a fifth circuit that receives the data-found signal, and is operable to perform synchronous processing of the data input triggered by assertion of the data-found signal. Such synchronous processing of the data input may include demodulation of burst data in a servo sector of a storage medium.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for accessing a magnetic storage medium, and more particularly to systems and methods for detecting data patterns from a magnetic storage medium.

Various embodiments of the present invention provide for burst demodulation common to processing information from a magnetic storage medium that is synchronized to a reliable 4T boundary, rather than a less reliable 1T boundary. In some embodiments of the present invention, a SAM is found, but it does not necessarily control the synchronization of subsequent processing of burst demodulation. Rather, the SAM found location or time is double checked against a reliable 4T boundary indicator to assure that the SAM found is properly located. Where SAM found is identified coincident with a 4T boundary, the processing of burst demodulation proceeds synchronous to the SAM found. Alternatively, where the SAM found is not coincident with a 4T boundary, burst demodulation processing is synchronized to a subsequent or preceding 4T boundary. As one of various advantages, the aforementioned alignment reduces or eliminates the possibility that the head location of a hard disk drive is confused between being offtrack or ontrack. In some cases, the 4T alignment utilizes a bit quad sync circuit that is already implemented in a read channel for other purposes. In such a case, modifications are made to allow use of an existing circuit to perform a novel synchronization approach in accordance with different embodiments of the present invention. Based on the disclosure provided herein, one of ordinary skill in the art will recognize other advantages that may be achieved in accordance with embodiments of the present invention.

Figure 1A:
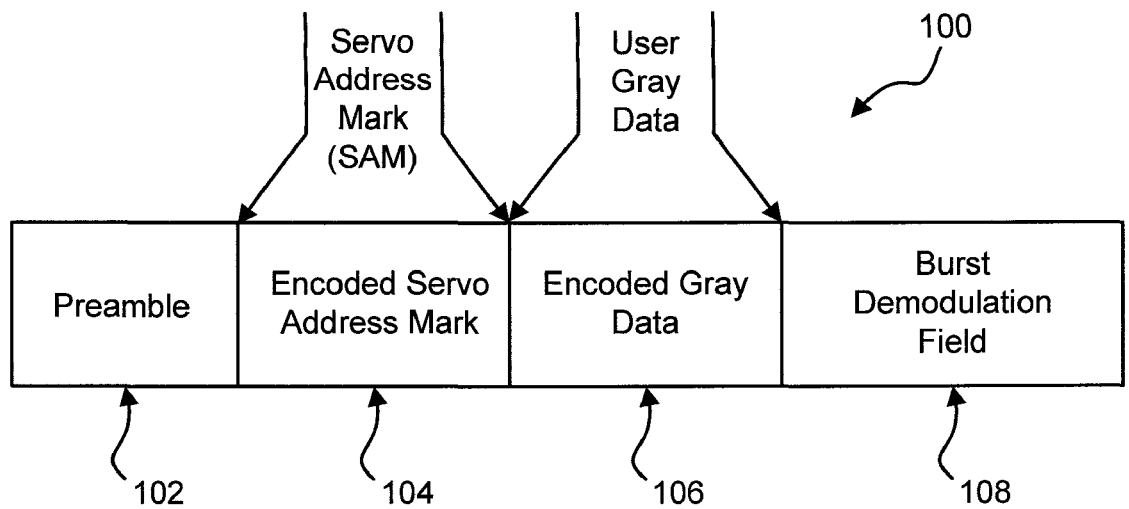
FIGS. 1a, 1b, 2 and 3 show prior art approaches to synchronization.
Figure 1B:
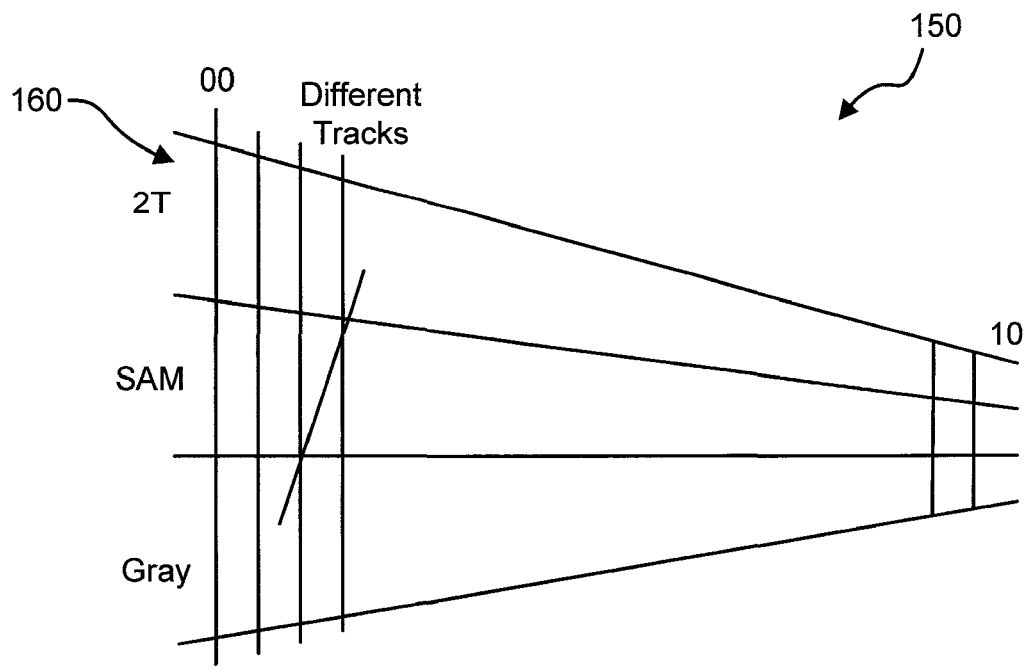
Figure 2:
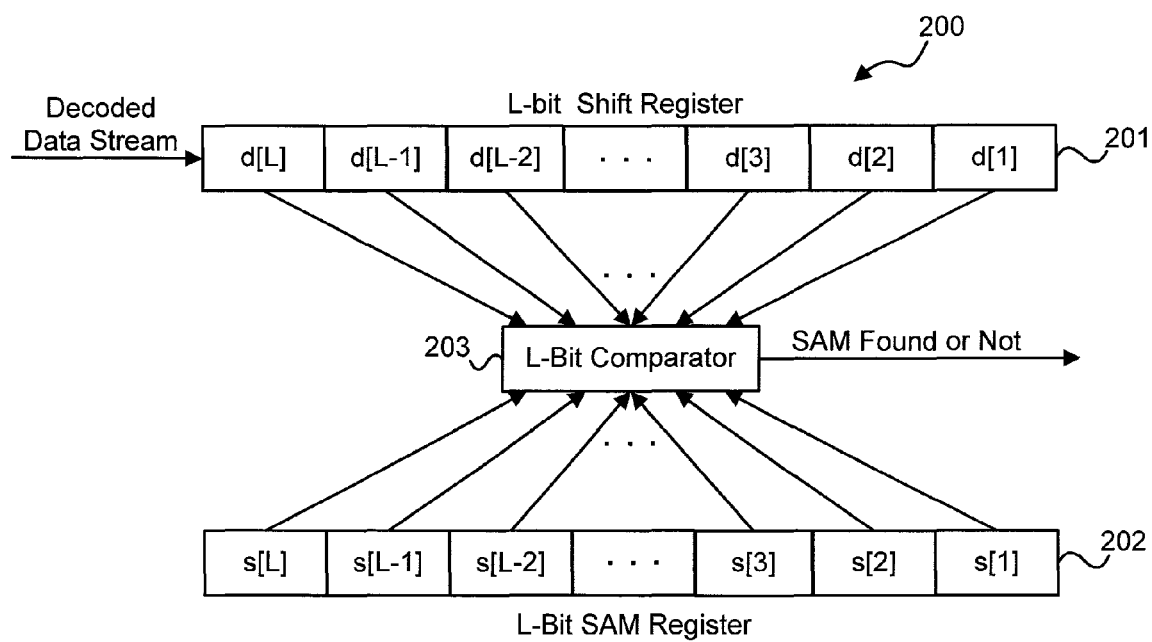
Figure 3:
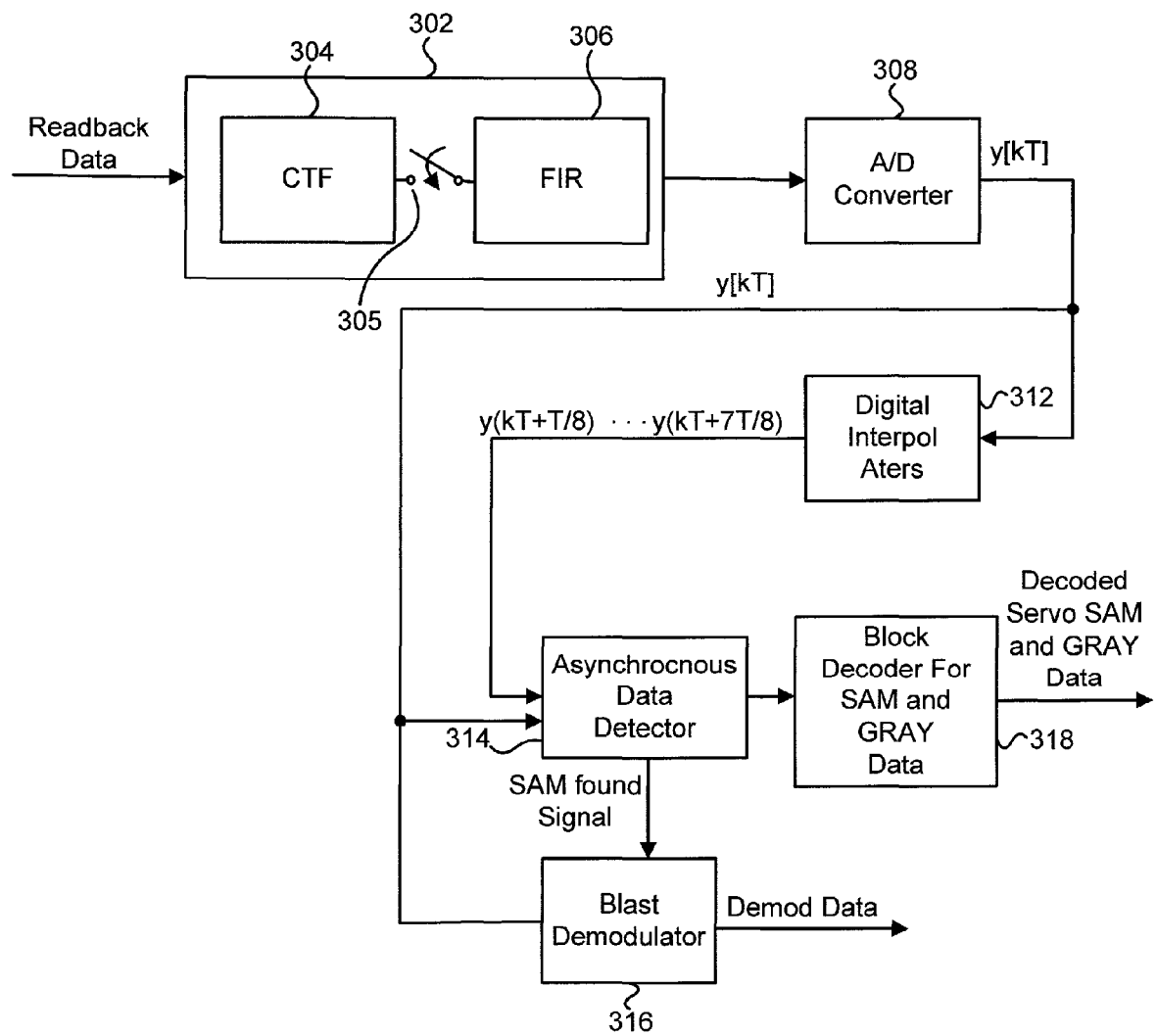
Figure 4:
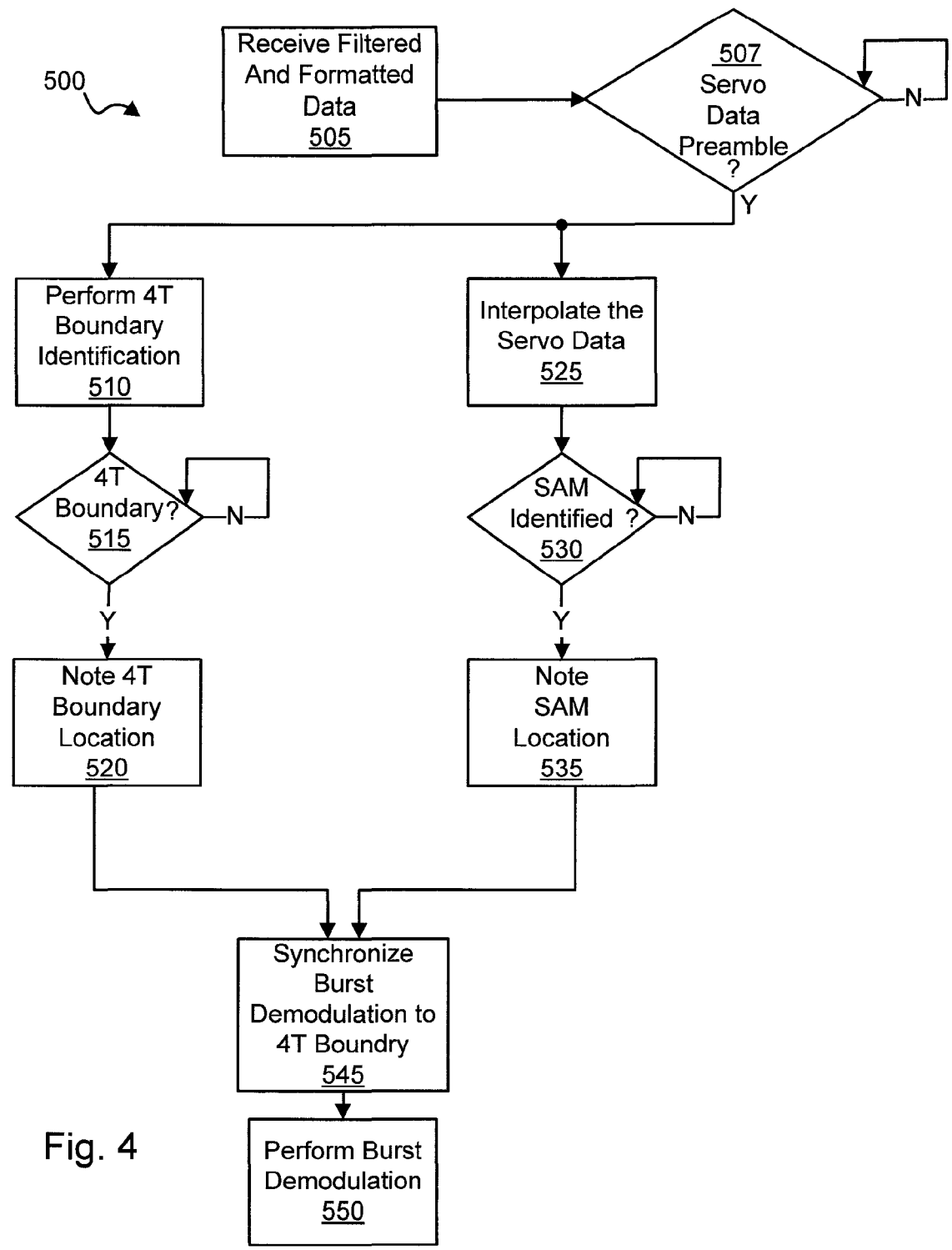
FIG. 4 is a flow diagram showing a process for synchronization in accordance with various embodiments of the present invention.

Turning to FIG. 4, a flow diagram 500 depicts a method in accordance with some embodiments of the present invention for synchronizing to an asynchronous signal. Following flow diagram 500, filtered and/or formatted data is continuously received as a stream of data (block 505). This may include accessing information from a track of a magnetic storage medium. Such a magnetic storage medium may be a platter incorporated in a hard disk drive. The data may include user information in addition to information from servo data sectors that are intermixed between the user information. Such servo data sectors may include, but are not limited to, a preamble pattern that is followed by a servo address mark (SAM). In addition, the SAM may be followed by encoded Gray data and one or more burst demodulation fields.

The received data is monitored to determine whether a known preamble pattern from a servo data sector has been received (block 507). Various preamble patterns may be utilized in accordance with different embodiments of the present invention. Where the preamble pattern has not yet been detected (block 507), the received data stream is continually monitored for the preamble. When the preamble pattern is identified (block 507), a digital interpolation is performed to identify the peaks of the received data as sampled (block 525). Such digital interpolation may be better understood through reference to an exemplary waveform 600 of FIG. 5 that represents received data. It should be noted that in a search mode of operation a continuous detection process may be performed while looking to identify the preamble as previously discussed. In addition, the data is monitored to determined 4T boundaries as is known in the art (blocks 510, 515, 520). However, in a normal mode of operation, the location of the preamble is known as it (or another preamble) was previously detected. In such a case, block 507, block 510, block 515 and block 520 would be adequately replaced by a block that simply stated "receive 4T boundary identification" as the 4T boundary would be known. This 4T boundary could then be used in identifying an appropriate start point in accordance with different embodiments of the present invention. In the end, once the SAM is found (block 535) and the 4T boundary is known (block 520), the burst demodulation is synchronized to either a 4T boundary that occurs concurrent with a 1T boundary at which the SAM was found, or at either a 4T boundary preceding or succeeding the boundary at which the SAM was found.

Figure 5:
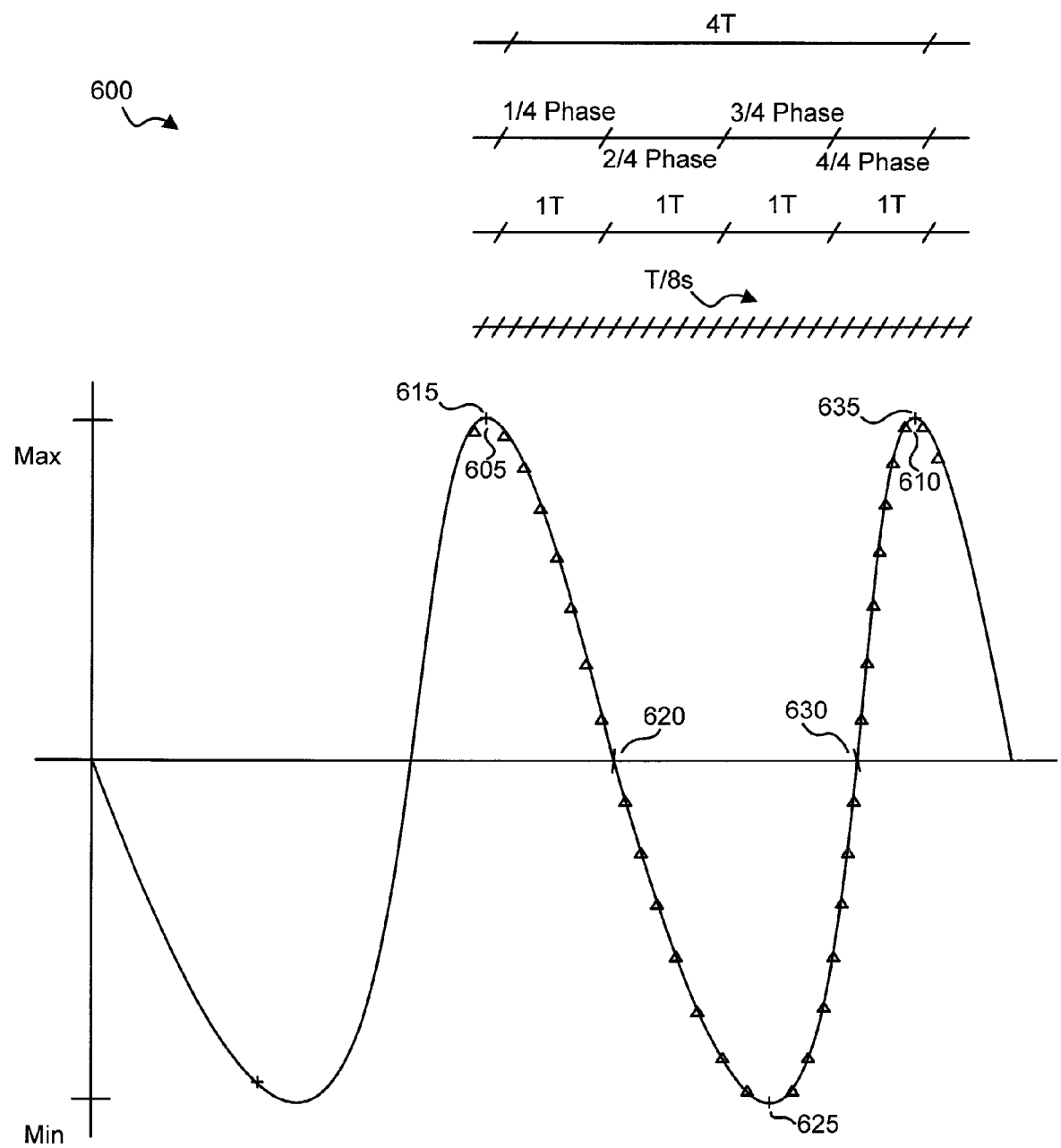
FIG. 5 shows an exemplary waveform of read data utilized to describe the various embodiments of the present invention.

Turning to FIG. 5, waveform 600 is sampled a number of times over a period extending from one peak 605 to a subsequent peak 610. Peak 605 and peak 610 are referred to as "4T boundaries". In addition, waveform 600 is divided into four "1T sections" In this case, a 1T boundary 615 exists coincident to 4T boundary 605, and another 1T boundary 635 exists coincident with 4T boundary 610. Other 1T boundaries 620, 625, 630 are set at the ¼, ½ and ¾ locations of waveform 600. In one particular embodiment of the present invention, the sampling rate of waveform 600 is set at 1T, and interpolation points (identified as T/8s) are created for each sample period. The samples may be used in the above mentioned digital interpolation process of block 525 to identify the various contours and transitions of wave form 600.

This digital interpolation provides points on waveform 600 that may be used to determine the best phase of waveform 600 (in this case the best 1T boundary) at which to identify the SAM (block 530). Again, using waveform 600 as a particular example, the best phase is determined using a T/8 interpolation resolution. Determination of the best phase in part governs synchronization with a succeeding burst demodulation field. The sampling process continues until the SAM is found (block 530). With the SAM found (block 530), identification of the succeeding Gray code and burst demodulation may be accomplished based on a "location" of the identified SAM (block 535). The location may be, for example, a time marker from which a counter may be referenced (i.e., a counter may be reset when the SAM is found). Based on the disclosure provided herein, one of ordinary skill in the art may recognize a number of approaches for identifying the location of a SAM found such that the identification may be used to predict a point at which a future event is predicted.

In some cases, the aforementioned best phase may be used to count the expected location of the succeeding burst demodulation. In such a case, the best phase would determined through a comparison with a threshold of 3T/8 to determine if a sampling of the succeeding burst demodulation is to be synchronized to the cycle immediately succeeding the SAM, or to wait a cycle. Specifically, where the best phase is less than or equal to the 3T/8 location, then a counter operating to synchronize the start of burst demodulation starts from the current cycle. Otherwise, the counter starts counting from the next cycle. Said another way, an attempt is made to identify a 1T boundary from which the demodulation counting is started. In some cases, however, relying on a 1T boundary problematic where a channel is either not optimized or where there is substantial noise or a low signal to noise ratio in the channel. In particular, it is possible that any noise in the channel may corrupt a timing mark based on a 1T boundary. Consequently, synchronization to the burst demodulation may be off by 1T. Such an error may make the difference between sampling at a minimum instead of a maximum. This can be a problematic in a hard disk drive scenario that could in the worst case result in user data being erroneously erased.

In addition, when the preamble pattern is identified (block 507), a 4T boundary identification is preformed (block 510). As previously stated, this detection may have already occurred in which case the 4T boundary is merely provided rather than being re-established. Using exemplary waveform 600, identification of a 4T boundary includes identifying peak 605 and peak 610. In one particular embodiment of the present invention, a bit quad sync circuit is used to identify the 4T boundary. In such a case, the analog to digital converted value corresponding to a 2T preamble may be, for example: 0, 20, 0, −20, 0, 20, 0, −20. The aforementioned bit quad sync circuit may filter these samples with [1 1 −1 −1 1 1 −1 −1] to yield a filtered output of: 80, 80, −80, −80, 80, 80, −80, −80. This filtered output may then be detected with a threshold comparator implementing a comparison with zero such that the 2T preamble pattern '110011001100' results. The bit quad sync circuit then compares the detected pattern with '11001100', '10011001', '00110011' or '01100110'. The results of the comparison identifies a reliable 4T boundary (i.e., peak 605 or peak 610) for the 2T preamble phase. With the 4T boundary found (block 515), identification of the succeeding Gray code and burst demodulation may be accomplished based on a "location" of the identified 4T boundary (block 520). Again, the location may be, for example, a time marker from which a counter may be referenced (i.e., a counter may be reset when the 4T boundary is found). Based on the disclosure provided herein, one of ordinary skill in the art may recognize a number of approaches for identifying the location of a 4T boundary such that the identification may be used to predict a point at which a future event is predicted.

Both the 4T boundary location (block 520) and the SAM found location (block 535) are used in combination to determine when to expect the subsequent burst demodulation field. In particular, the burst demodulation is synchronized to the identified 4T boundary. In some cases, the SAM found occurs at a 4T boundary. In such cases, the SAM found provides the location from which processing of the burst demodulation is synchronized. As mentioned above, however, the SAM found may possibly be misidentified by 1T or more. In such cases, processing of the burst demodulation is delayed until the next 4T boundary is identified. Thus, one advantage of some embodiments of the present invention is the avoidance of the detrimental effects of misalignment of the SAM found and 4T boundary. With the burst demodulation synchronized to a 4T boundary either coincident with a SAM found or occurring after a SAM found, the burst demodulation may be performed (block 550).

Turning to FIG. 5, exemplary waveform 600 may be used to provide a particular example of processing in accordance with various embodiments of the present invention. In the example, assume that SAM found occurs somewhere between peak 605 and peak 610 (i.e., exemplary 4T boundaries). In such a case, burst demodulation would be synchronized to peak 610. Alternatively, assume that SAM found occurs coincident with peak 605. In such a case, burst demodulation would be synchronized to peak 605. It should be noted that the 4T boundary may be established at other locations on exemplary waveform 600 depending upon particular circumstances. For example, a 4T boundary may be established at minimum peak 625. Based on the disclosure provided herein, one of ordinary skill in the art will recognize 4T boundaries that may be used in relation to a SAM found signal to synchronize processing of burst demodulation.

Figure 6:
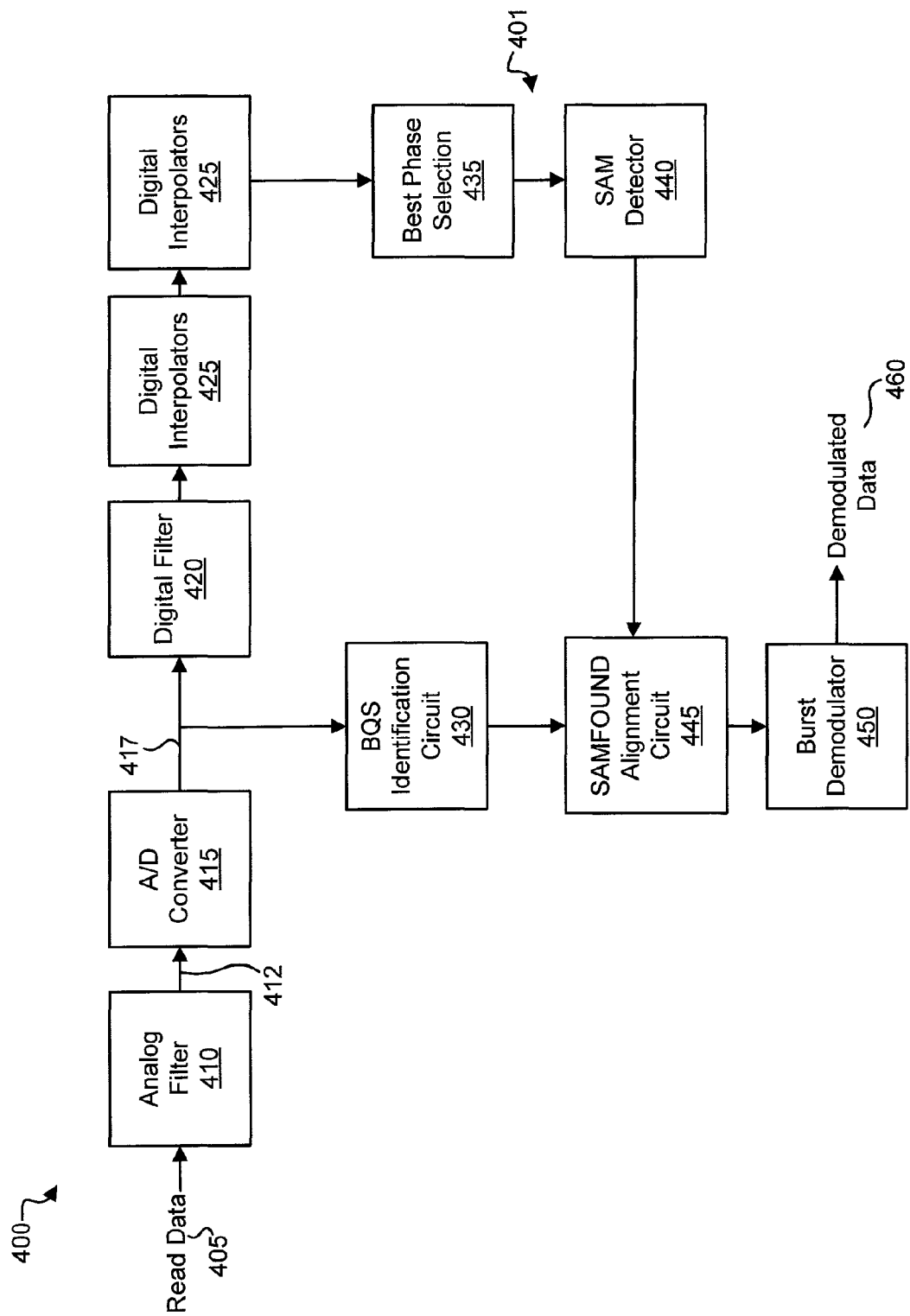
FIG. 6 depicts a readback channel in accordance with various embodiments of the present invention.

Turning to FIG. 6, a readback channel 400 in accordance with various embodiments of the present invention is depicted. Readback channel 400 may be implemented to, for example, access data from a magnetic storage medium (not shown). In the situation where readback channel is implemented in relation to a magnetic storage medium, read channel 400 may receive read data 405 from the magnetic storage medium. Read data 405 may include a servo waveform corresponding to an encoded servo pattern. Read data 405 is provided to an analog filter circuit 410 that is operable to receive read data 405 and filter it to a desired level and/or frequency. In one particular embodiment of the present invention, analog filter circuit 410 includes a combination of a continuous time filter (CTF) and a finite impulse response (FIR) filter. Based on the disclosure provided herein, one of ordinary skill in the art will recognize a variety of filter types and combinations of filter types that may be utilized to equalize or otherwise massage read data 405 into a desired signal level and/or frequency.

An analog output 412 of analog filter circuit 410 is provided to an analog to digital converter 415 where it is converted from the analog signal domain to a digital signal domain. Analog to digital converter 415 may be any analog to digital conversion circuit or process known in the art. The amount of resolution offered by analog to digital converter 415 may be selected based on the particular requirements of a given embodiment of the present invention. In one particular embodiment of the present invention, analog to digital converter 415 is a six bit analog to digital converter.

A digital output 417 from analog to digital converter 415 is provided to both a SAM identification circuit 401 and to a Bit Quad Sync ("BQS") circuit 430. SAM identification circuit 401 is operable to detect a servo address mark within a servo data sector of a magnetic storage medium. SAM identification circuit 401 includes a digital filter circuit 420, a digital interpolation circuit 425, a best phase selection circuit 435 and a SAM detector circuit 440. Digital filter circuit 420 filters digital output 417 as is known in the art. In one particular embodiment of the present invention, digital filter circuit 420 is a five tap constrained digital finite impulse response filter as is known in the art. Based upon the disclosure provided herein, one of ordinary skill in the art will recognize a variety of digital filters that may be implemented in accordance with different embodiments of the present invention.

The filtered digital signal is interpolated to identify discrete signal locations of a waveform using digital interpolation circuit 425. Using the interpolated signals, a best phase for sampling the waveform is determined by a best phase selection circuit 435. As previously discussed, best phase selection circuit 435 utilizes a number of interpolated samples to determine the best phase for detecting information in a waveform. In some cases, eight samples are used to predict the best phase. In such a case, the best phase may be determined through a comparison with a threshold of 3T/8 to determine if a sampling of the succeeding burst demodulation is to be synchronized to the cycle immediately succeeding the SAM, or to wait a cycle. Specifically, where the best phase is less than or equal to the 3T/8 location, then a counter operating to synchronize the start of burst demodulation starts from the current cycle. Otherwise, the counter starts counting from the next cycle. Said another way, an attempt is made to identify a 1T boundary from which the demodulation counting is started. In some cases, however, relying on a 1T boundary problematic where a channel is either not optimized or where there is substantial noise or a low signal to noise ratio in the channel. In particular, it is possible that any noise in the channel may corrupt a timing mark based on a 1T boundary. Consequently, synchronization to the burst demodulation may be off by 1T. Such an error may make the difference between sampling at a minimum instead of a maximum. This can be a problematic in a hard disk drive scenario that could in the worst case result in user data being erroneously erased.

Using the identified best phase, the location of a SAM in the servo data is identified using SAM detector circuit 440. Sam detector circuit 440 may be, for example, a comparator that continually compares received values against a desired SAM. SAM detector circuit 440 provides a SAM found output to a SAMFOUND alignment circuit 445.

BQS circuit 430 operates to identify 4T boundaries of a received waveform. In one particular embodiment of the present invention, read data 405 may include the following exemplary 2T preamble: 0, 20, 0, −20, 0, 20, 0, −20. Analog filter 410 may filter using [1 1 −1 −1 1 1 −1 −1] to yield: 80, 80, −80, −80, 80, 80, −80, −80. Analog to digital converter circuit 415 threshold compares the received signal with zero to yield the 2T preamble pattern, '110011001100'. BQS circuit 430 compares the aforementioned 2T preamble pattern with '11001100', '10011001', '00110011' or '01100110'. The results of the comparison identifies a reliable 4T boundary (i.e., peak 605 or peak 610) for the 2T preamble phase. BQS circuit 430 provides a 4T boundary found signal to SAMFOUND alignment circuit 445.

SAMFOUND alignment circuit 445 combines the indications of SAM found and 4T boundary found to synchronize subsequent burst demodulation by a burst demodulation circuit 450. In particular, burst demodulation circuit 450 is signaled to begin burst demodulation at an identified 4T boundary. Thus, where the SAMFOUND signal from SAM detector circuit 440 is received coincident with a 4T boundary identified by BQS circuit 430, SAMFOUND alignment circuit 445 signals burst demodulation circuit 450 to begin processing immediately. Alternatively, where the SAMFOUND signal from SAM detector circuit 440 is received at a time that is misaligned from a 4T boundary identified by BQS circuit 430, SAMFOUND alignment circuit 445 signals burst demodulation circuit 450 to begin processing on the next 4T boundary. Burst demodulation circuit 450 may be any burst demodulation circuit known in the art. Burst demodulation circuit 450 receives the filtered and converted read data 405, and provide demodulated data 460.

As just one of many advantages of some embodiments of the present invention, the possibility of confusing an offtrack head location for an ontrack head location will be reduced for servo demodulation. At least in part, this is because demodulation may be done based on a reliable 4T boundary rather than a less reliable 1T boundary. In many hard disk drive application, a BQS circuit is already in place in the channel, and therefore the cost of implementing systems in accordance with the present invention may be relatively small.

In conclusion, the invention provides novel systems, devices, methods and arrangements for improving data synchronization. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for synchronizing data processing, the method comprising:
   receiving a data input;
   sampling the data input at a sample period, wherein a sample set is generated;
   receiving an indication of a first periodic boundary associated with a first pattern in the sample set;
   detecting a second pattern in the sample set, wherein detection of the second pattern identifies a second periodic boundary; and
   based at least in part on the first periodic boundary and the second periodic boundary, determining a time to transmit a data-found signal, wherein the first periodic boundary and the second periodic boundary are located only a non-zero integer multiple of the sample period from the other.

2. The method of claim 1, wherein the method further comprises:
   detecting the first pattern in the sample set, wherein the indication of the first periodic boundary is generated at least in part based on the detection of the first pattern.

3. The method of claim 1, wherein the first periodic boundary is a 4T boundary, wherein the second periodic boundary is a 1T boundary, wherein the sample period is T, and wherein the sample period is represented by eight interpolated points.

4. The method of claim 3, wherein thirty two interpolated points are created between each 4T boundary, and wherein eight interpolated points are created between each 1T boundary.

5. The method of claim 4, wherein based on a subset of the eight interpolated points between each 1T boundary, the second periodic boundary is determined.

6. The method of claim 5, wherein based on the subset of the eight interpolated points between each 1T boundary, a phase location of the second periodic boundary relative to the first periodic boundary is determined.

7. The method of claim 1, wherein determining the time to transmit the data-found signal is done by a process selected from a group consisting of:
   transmitting the data-found signal substantially coincident with the current second periodic boundary when the second periodic boundary and the first periodic boundary are in the same phase;
   transmitting the data-found signal substantially coincident with the next first periodic boundary when the second periodic boundary and the first periodic boundary are in different phases; and
   transmitting the data-found signal substantially coincident with the preceding first periodic boundary when the second periodic boundary and the first periodic boundary are in different phases.

8. The method of claim 7, wherein the first periodic boundary is a 4T boundary, wherein the second periodic boundary is a 1T boundary, and wherein the data-found signal is transmitted substantially coincident with the current first periodic boundary, and wherein the first periodic boundary and the second periodic boundary are considered in the same phase when the second periodic boundary occurs within +/−1T of the first periodic boundary.

9. The method of claim 7, wherein the first periodic boundary is a 4T boundary, wherein the second periodic boundary is a 1T boundary, and wherein the data-found signal is transmitted substantially coincident with the next first periodic boundary, and wherein the first periodic boundary and the second periodic boundary are considered to be in different phases when the second periodic boundary occurs more than 1T away from the first periodic boundary.

10. The method of claim 1, wherein the data input is received from a storage medium, wherein the first pattern is a preamble pattern included on the storage medium, and wherein the second pattern is a SAM pattern included on the storage medium.

11. The method of claim 10, wherein the method further comprises:
   transmitting the data-found signal at the determined time, wherein the data-found signal triggers synchronous processing of the data input.

12. The method of claim 11, wherein the synchronous processing of the data input includes demodulation of burst data in a servo sector of the storage medium.

13. A system for data synchronization, the system comprising:
   a first circuit for sampling a data input at a first sample period, wherein the first circuit generates a sample set;
   a second circuit, wherein the second circuit receives the sample set, wherein the second circuit is operable to detect a first pattern in the sample set, and wherein the second circuit is operable to establish a first periodic boundary based on detection of the first pattern;
   a third circuit, wherein the third circuit receives the sample set, wherein the third circuit is operable to detect a second pattern in the sample set, and wherein the third circuit is operable to establish a second periodic boundary based on detection of the second pattern; and
   a fourth circuit, wherein the fourth circuit is operable to assert a data-found signal based at least in part on a relationship of the second periodic boundary with the first periodic boundary, and wherein the first periodic boundary is a distance that is only a non-zero integer multiple of the sample period from the second periodic boundary.

14. The system of claim 13, wherein the system further comprises:
a fifth circuit, wherein the fifth circuit receives the data-found signal, and wherein the fifth circuit is operable to perform synchronous processing of the data input triggered by assertion of the data-found signal.

15. The system of claim 14, wherein the data input is received from a storage medium including user data and sector data, wherein the first pattern is a preamble pattern included in the sector data, wherein the second pattern is a SAM pattern included in the sector data, and wherein the synchronous processing of the data input includes demodulation of burst data included in the sector data.

16. The system of claim 13, wherein the first periodic boundary is a 4T boundary, wherein the second periodic boundary is a 1T boundary, wherein the sample period is T, and wherein the sample period is divided into eight interpolated points.

17. The system of claim 13, wherein asserting the data-found is done based on a criteria selected from the group consisting of:
asserting the data-found signal substantially coincident with the current second periodic boundary when the second periodic boundary and the first periodic boundary are in the same phase; and
asserting the data-found signal substantially coincident with the next first periodic boundary when the second periodic boundary and the first periodic boundary are in different phases; and
asserting the data-found signal substantially coincident with the preceding first periodic boundary when the second periodic boundary and the first periodic boundary are in different phases.

18. The system of claim 17, wherein the first periodic boundary is a 4T boundary, wherein the second periodic boundary is a 1T boundary, and wherein the data-found signal is asserted substantially coincident with the current first periodic boundary, and wherein the first periodic boundary and the second periodic boundary are considered in the same phase when the second periodic boundary occurs within +/−1T of the first periodic boundary.

19. The system of claim 17, wherein the first periodic boundary is a 4T boundary, wherein the second periodic boundary is a 1T boundary, and wherein the data-found signal is asserted substantially coincident with the next first periodic boundary, and wherein the first periodic boundary and the second periodic boundary are considered to be in different phases when the second periodic boundary occurs more than 1T away from the first periodic boundary.

20. The system of claim 13, wherein the system further comprises:
a storage medium, wherein the storage medium includes user data and sector data, and wherein the sector data includes a preamble pattern and a SAM pattern; and
wherein the first pattern is the preamble pattern, and wherein the second pattern is the SAM pattern.

21. The system of claim 13, wherein the system is implemented as part of a storage device.

22. The system of claim 13, wherein the system is implemented as part of an integrated circuit.

23. A method for accessing information maintained on a storage medium, the method comprising:
providing a storage medium, wherein the storage medium includes user data and sector data, and wherein the sector data includes a preamble pattern and a SAM pattern;
accessing a signal from the storage medium and providing the signal as a data input;
sampling the data input at a sample period, wherein a sample set is generated;
detecting a first pattern in the sample set, wherein detection of the first pattern identifies a first periodic boundary;
detecting a second pattern in the data set, wherein detection of the second pattern identifies a second periodic boundary;
based at least in part on a relationship of the second periodic boundary to the first periodic boundary, asserting a data-found signal, wherein asserting the data found signal includes:
asserting the data-found signal substantially coincident with the current second periodic boundary when the second periodic boundary and the first periodic boundary are in the same phase; and
asserting the data-found signal substantially coincident with either the next first periodic boundary or the preceding first periodic boundary when the second periodic boundary and the first periodic boundary are in different phases.

24. The method of claim 23, wherein the first periodic boundary is a 4T boundary, wherein the second periodic boundary is a 1T boundary, wherein the sample period is T, and wherein the sample period is represented by eight interpolated points.

25. The method of claim 24, wherein thirty two interpolated points are created between each 4T boundary, and wherein eight interpolated points are created between each 1T boundary.

26. The method of claim 25, wherein based on a subset of the eight interpolated points between each 1T boundary, the second periodic boundary is determined.

27. The method of claim 26, wherein based on the subset of the eight interpolated points between each 1T boundary, a phase location of the second periodic boundary relative to the first periodic boundary is determined.

28. The method of claim 23, wherein determining the time to transmit the data-found signal is done by a process selected from a group consisting of:
transmitting the data-found signal substantially coincident with the current second periodic boundary when the second periodic boundary and the first periodic boundary are in the same phase;
transmitting the data-found signal substantially coincident with the next first periodic boundary when the second periodic boundary and the first periodic boundary are in different phases; and
transmitting the data-found signal substantially coincident with the preceding first periodic boundary when the second periodic boundary and the first periodic boundary are in different phases.

29. A method for synchronizing data processing, the method comprising:
receiving an indication of a first periodic boundary associated with a first pattern in a sample set; detecting a second pattern in the sample set, wherein detection of the second pattern identifies a second periodic boundary; and
based at least in part on a relationship of the second periodic boundary to the first periodic boundary, asserting a data-found signal substantially coincident with the current second periodic boundary when the second periodic boundary and the first periodic boundary are in the same phase.

30. The method of claim 29, wherein the method further comprises:
receiving a data input;
sampling the data input at a sample period to yield the sample set.

31. The method of claim 29, wherein the method further comprises:
detecting the first pattern in the sample set, wherein the indication of the first periodic boundary is generated at least in part based on the detection of the first pattern.

32. The method of claim 29, wherein the first periodic boundary is a 4T boundary, wherein the second periodic boundary is a 1T boundary, wherein the sample period is T, and wherein the sample period is represented by eight interpolated points.

33. The method of claim 29, wherein asserting the data-found signal substantially coincident with either the next first periodic boundary or the preceding first periodic boundary when the second periodic boundary and the first periodic boundary are in different phases is done by a process selected from a group consisting of:
asserting the data-found signal substantially coincident with the next first periodic boundary when the second periodic boundary and the first periodic boundary are in different phases; and
asserting the data-found signal substantially coincident with the preceding first periodic boundary when the second periodic boundary and the first periodic boundary are in different phases.

34. A data synchronization circuit, the circuit comprising:
a first circuit for sampling a data input at a first sample period, wherein the first circuit generates a sample set;
a second circuit, wherein the second circuit receives the sample set, wherein the second circuit is operable to detect a first pattern in the sample set, and wherein the second circuit is operable to establish a first periodic boundary based on detection of the first pattern;
a third circuit, wherein the third circuit receives the sample set, wherein the third circuit is operable to detect a second pattern in the sample set, and wherein the third circuit is operable to establish a second periodic boundary based on detection of the second pattern; and
a fourth circuit, wherein the fourth circuit is operable to assert a data-found signal based at least in part on a relationship of the second periodic boundary with the first periodic boundary, and wherein the first periodic boundary is a distance that is only a non-zero integer multiple of the sample period from the second periodic boundary.

35. The circuit of claim 34, wherein the circuit further comprises:
a fifth circuit, wherein the fifth circuit receives the data-found signal, and wherein the fifth circuit is operable to perform synchronous processing of the data input triggered by assertion of the data-found signal.

36. The circuit of claim 35, wherein the data input is received from a storage medium including user data and sector data, wherein the first pattern is a preamble pattern included in the sector data, wherein the second pattern is a SAM pattern included in the sector data, and wherein the synchronous processing of the data input includes demodulation of burst data included in the sector data.

37. The system of claim 34, wherein the first periodic boundary is a 4T boundary, wherein the second periodic boundary is a 1T boundary, wherein the sample period is T, and wherein the sample period is divided into eight interpolated points.

38. The circuit of claim 34, wherein asserting the data-found is done based on a criteria selected from the group consisting of:
asserting the data-found signal substantially coincident with the current second periodic boundary when the second periodic boundary and the first periodic boundary are in the same phase; and
asserting the data-found signal substantially coincident with the next first periodic boundary when the second periodic boundary and the first periodic boundary are in different phases; and
asserting the data-found signal substantially coincident with the preceding first periodic boundary when the second periodic boundary and the first periodic boundary are in different phases.

39. The circuit of claim 38, wherein the first periodic boundary is a 4T boundary, wherein the second periodic boundary is a 1T boundary, and wherein the data-found signal is asserted substantially coincident with the current first periodic boundary, and wherein the first periodic boundary and the second periodic boundary are considered in the same phase when the second periodic boundary occurs within +/−1T of the first periodic boundary.

40. The circuit of claim 38, wherein the first periodic boundary is a 4T boundary, wherein the second periodic boundary is a 1T boundary, and wherein the data-found signal is asserted substantially coincident with the next first periodic boundary, and wherein the first periodic boundary and the second periodic boundary are considered to be in different phases when the second periodic boundary occurs more than 1T away from the first periodic boundary.

* * * * *